US011873871B2

(12) United States Patent
Song

(10) Patent No.: US 11,873,871 B2
(45) Date of Patent: Jan. 16, 2024

(54) BRAKE CALIPER

(71) Applicant: Inteplast Group Corporation, Livingston, NJ (US)

(72) Inventor: Shoumin Song, Port Lavaca, TX (US)

(73) Assignee: INTEPLAST GROUP CORPORATION, Livingston, NJ (US)

( * ) Notice: Subject to any disclaimer, the term of this patent is extended or adjusted under 35 U.S.C. 154(b) by 779 days.

(21) Appl. No.: 16/782,717

(22) Filed: Feb. 5, 2020

(65) Prior Publication Data
US 2021/0239166 A1    Aug. 5, 2021

(51) Int. Cl.
*F16D 55/227* (2006.01)
*F16D 65/00* (2006.01)
F16D 55/00 (2006.01)
F16D 127/02 (2012.01)
(Continued)

(52) U.S. Cl.
CPC ....... *F16D 55/227* (2013.01); *F16D 65/0056* (2013.01); *F16D 65/0075* (2013.01); *F16D 65/183* (2013.01); *F16D 2055/002* (2013.01); *F16D 2055/0008* (2013.01);
(Continued)

(58) Field of Classification Search
CPC ..... F16D 2055/0008; F16D 2055/0016; F16D 65/0068; F16D 65/0075; F16D 65/18; F16D 2055/002; F16D 55/226; F16D 55/227; F16D 65/0056; F16D 65/097; F16D 2055/0004; F16D 65/38; F16D 65/44; F16D 65/568; F16D 2055/227; F16D 65/183; F16D 2055/0029; F16D 2121/04; F16D 2127/02
See application file for complete search history.

(56) References Cited

U.S. PATENT DOCUMENTS 3,500,966 A * 3/1970 Birge .................... F16D 55/227
188/196 R
3,618,714 A * 11/1971 Croswell ................. F16D 65/54
192/111.1
(Continued)

FOREIGN PATENT DOCUMENTS

AT         392524 B  *  4/1991
CN     103154557 A  *  6/2013  ........... F16D 55/227
EP      3244084 A1  * 11/2017  ........... F16D 55/226

OTHER PUBLICATIONS

CN 100385134 C (Year: 2008).*

*Primary Examiner* — Robert A. Siconolfi
*Assistant Examiner* — Mahbubur Rashid
(74) *Attorney, Agent, or Firm* — Stinson LLP

(57) ABSTRACT

A brake caliper has an adjustment for controlling the location of the brake pads with respect to a brake rotor. The brake caliper includes a mount for attaching to a fixed surface to support the brake caliper, and a caliper connected to the mount for movement relative to the mount. A brake frame supports brake pads, one of which is movable with respect to the brake frame. An adjustor for controlling a position of the caliper with respect to the mount is configured for adjustment to change the position of the caliper with respect to the mount in an unactuated condition of the brake caliper thereby moving the caliper with respect to the mount and adjusting the position of the first and second brake pads with respect to the rotor. The brake caliper also may have an adjustable brake pressure feature.

21 Claims, 11 Drawing Sheets

(51) Int. Cl.
*F16D 65/18* (2006.01)
*F16D 121/04* (2012.01)

(52) U.S. Cl.
CPC .. *F16D 2055/0029* (2013.01); *F16D 2121/04* (2013.01); *F16D 2127/02* (2013.01)

(56) References Cited

U.S. PATENT DOCUMENTS

| | | | |
|---|---|---|---|
| 3,791,492 A * | 2/1974 | Neilsen | F16D 65/18 188/170 |
| 3,995,722 A * | 12/1976 | Jones | F16D 65/18 188/71.9 |
| 4,167,989 A * | 9/1979 | Meyer | F16D 65/18 188/71.9 |
| 4,181,201 A | 1/1980 | Mccarthy | |
| 4,228,875 A * | 10/1980 | Haraikawa | F16D 65/46 188/71.7 |
| 4,382,491 A * | 5/1983 | Chun | F16D 55/22655 188/196 P |
| 4,399,894 A * | 8/1983 | Tribe | F16D 55/224 188/71.9 |
| 4,798,269 A | 1/1989 | Lindner et al. | |
| 4,865,161 A | 9/1989 | Schneider et al. | |
| 5,076,401 A * | 12/1991 | Ta | B60T 13/22 188/71.9 |
| 5,145,035 A * | 9/1992 | Garrido | F16D 59/02 187/250 |
| 5,358,078 A * | 10/1994 | Gajek | B62L 1/00 188/26 |
| 5,379,867 A | 1/1995 | Macke et al. | |
| 5,437,351 A | 8/1995 | Lindner | |
| 6,161,658 A * | 12/2000 | Becocci | F16D 65/46 188/71.7 |
| 6,386,339 B1 * | 5/2002 | Woollams | F16D 59/02 188/203 |
| 8,127,897 B2 * | 3/2012 | Baldeosingh | F16D 65/18 188/170 |
| 9,127,735 B2 * | 9/2015 | Putz | F16D 65/18 |
| 2009/0266654 A1 * | 10/2009 | Holland | F16D 55/227 188/73.31 |
| 2010/0000828 A1 * | 1/2010 | Pericevic | F16D 55/22655 188/72.3 |
| 2010/0122876 A1 * | 5/2010 | Cao | B66D 5/30 188/71.8 |
| 2017/0261050 A1 * | 9/2017 | Polack | F16D 65/095 |
| 2020/0056666 A1 * | 2/2020 | Zhang | B66D 5/30 |

* cited by examiner

BRAKE CALIPER

FIELD OF THE INVENTION

The present invention is directed generally to a brake caliper that can be more precisely configured to improve wear and increase accuracy of braking.

BACKGROUND

Brake calipers are used in many different contexts for providing controlled and precise braking. For example in a manufacturing context, brake calipers may be used to periodically stop equipment in the course of manufacturing another product. It can be very important for the brake caliper to function with great precision over a long period of time. The entire manufacturing process could be forced to stop due to a malfunctioning brake caliper. By its very nature the brake caliper experiences substantial forces in operation. Brake pads may wear unevenly causing premature failure. Moreover, uneven application of force by the brake pads can cause twisting of the brake caliper, which can bend and break components. Finally, the brake may apply too much or too little braking force.

SUMMARY

In one aspect of the present invention, a brake caliper for selectively applying a braking force to a rotor generally comprise a mount for attaching to a fixed surface and a caliper connected to the mount for movement relative to the mount. The caliper includes a brake frame and a first brake pad affixed to the brake frame. A pusher plate is supported by the caliper and movable with respect to the remainder of the caliper. A second brake pad connected to the pusher plate for conjoint movement with the pusher plate with respect to the remainder of the caliper is arranged in generally opposing relationship with the first brake pad for engaging and braking opposite sides of the rotor. An adjustor for controlling a position of the caliper with respect to the mount is configured for adjustment to change the position of the caliper with respect to the mount in an unactuated condition of the brake caliper thereby moving the caliper with respect to the mount and adjusting the position of the first and second brake pads with respect to the rotor.

In another aspect of the present invention, a brake caliper for selectively applying a braking force to a rotor generally comprises a mount for attaching to a fixed surface and a caliper connected to the mount for movement relative to the mount. The caliper includes a brake frame and a first brake pad affixed to the brake frame. A pusher plate supported by the caliper and movable with respect to the remainder of the caliper connects a second brake pad for conjoint movement with the pusher plate with respect to the remainder of the caliper. The second brake pad is arranged in generally opposing relationship with the first brake pad for engaging and braking opposite sides of the rotor. An adjustable spring engages the pusher plate for urging the pusher plate to move toward the first brake pad.

Other aspects of the present invention will be in part apparent and in part pointed out hereinafter.

BRIEF DESCRIPTION OF THE DRAWINGS

Corresponding reference characters indicate corresponding parts throughout the several view of the drawings.

DETAILED DESCRIPTION

Figure 1:
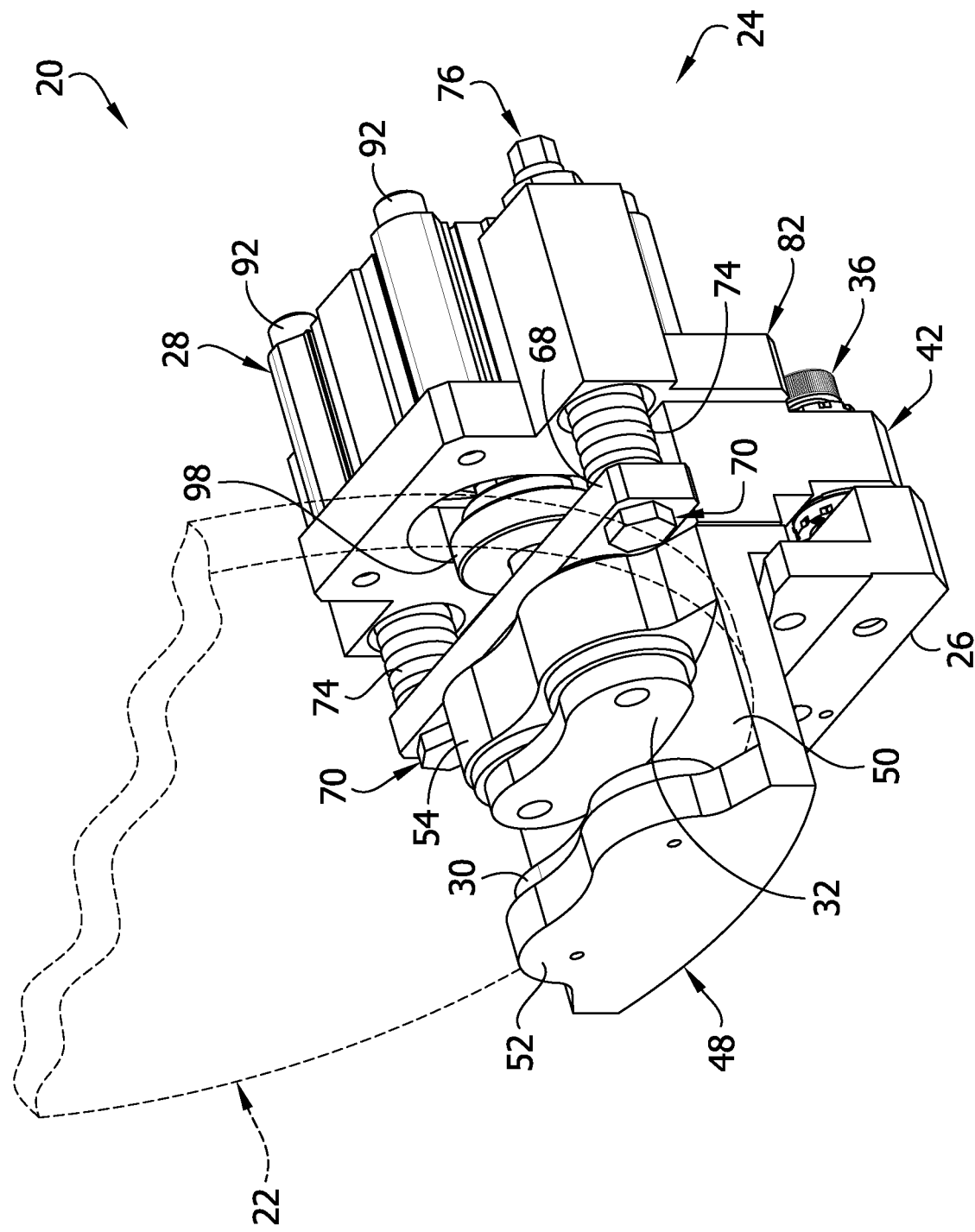
FIG. 1 is a perspective of a brake including a brake caliper and a rotor.
Figure 2:
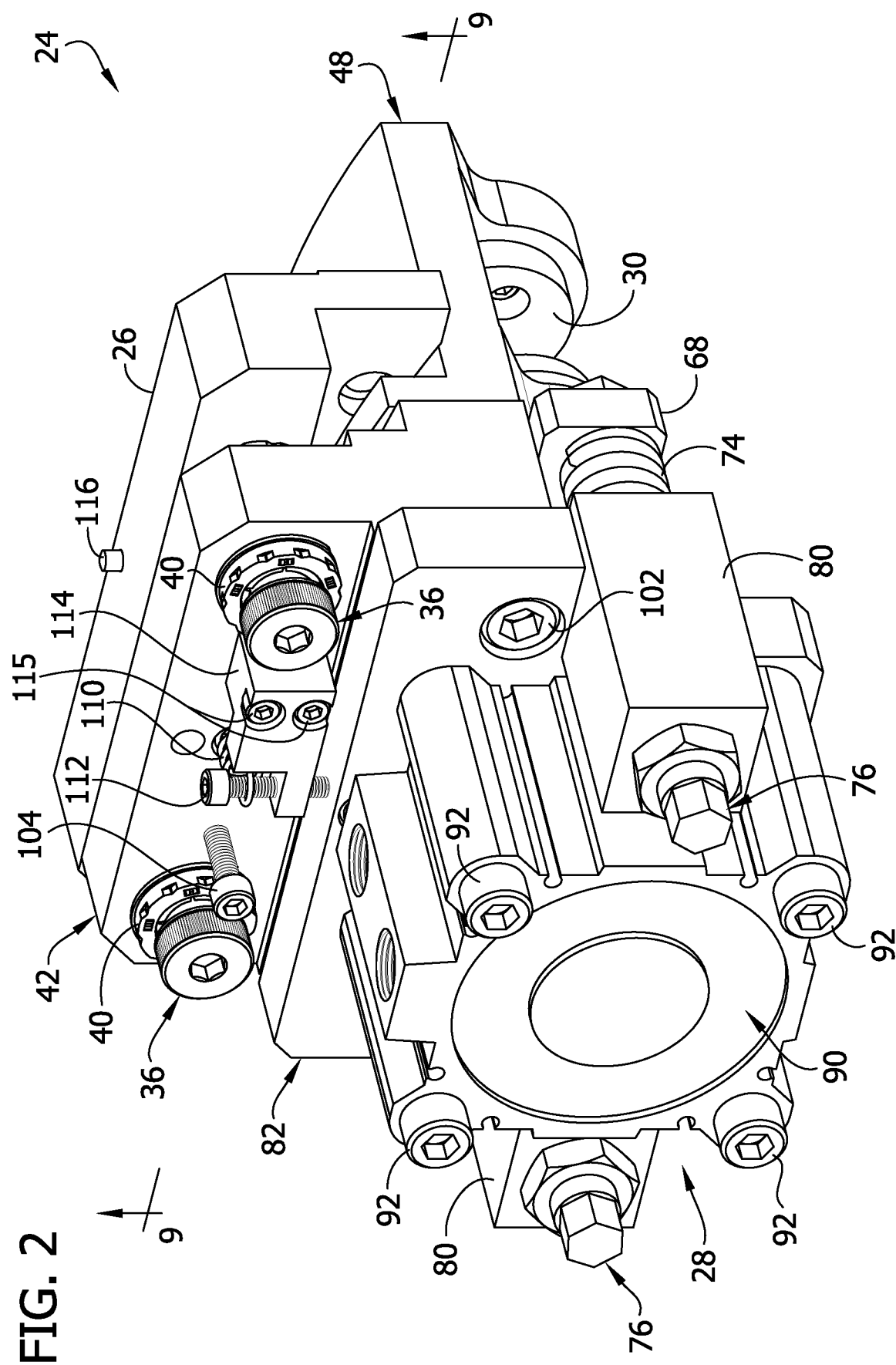
FIG. 2 is an enlarged perspective of the brake caliper shown inverted from the position of FIG. 1.
Figure 3:
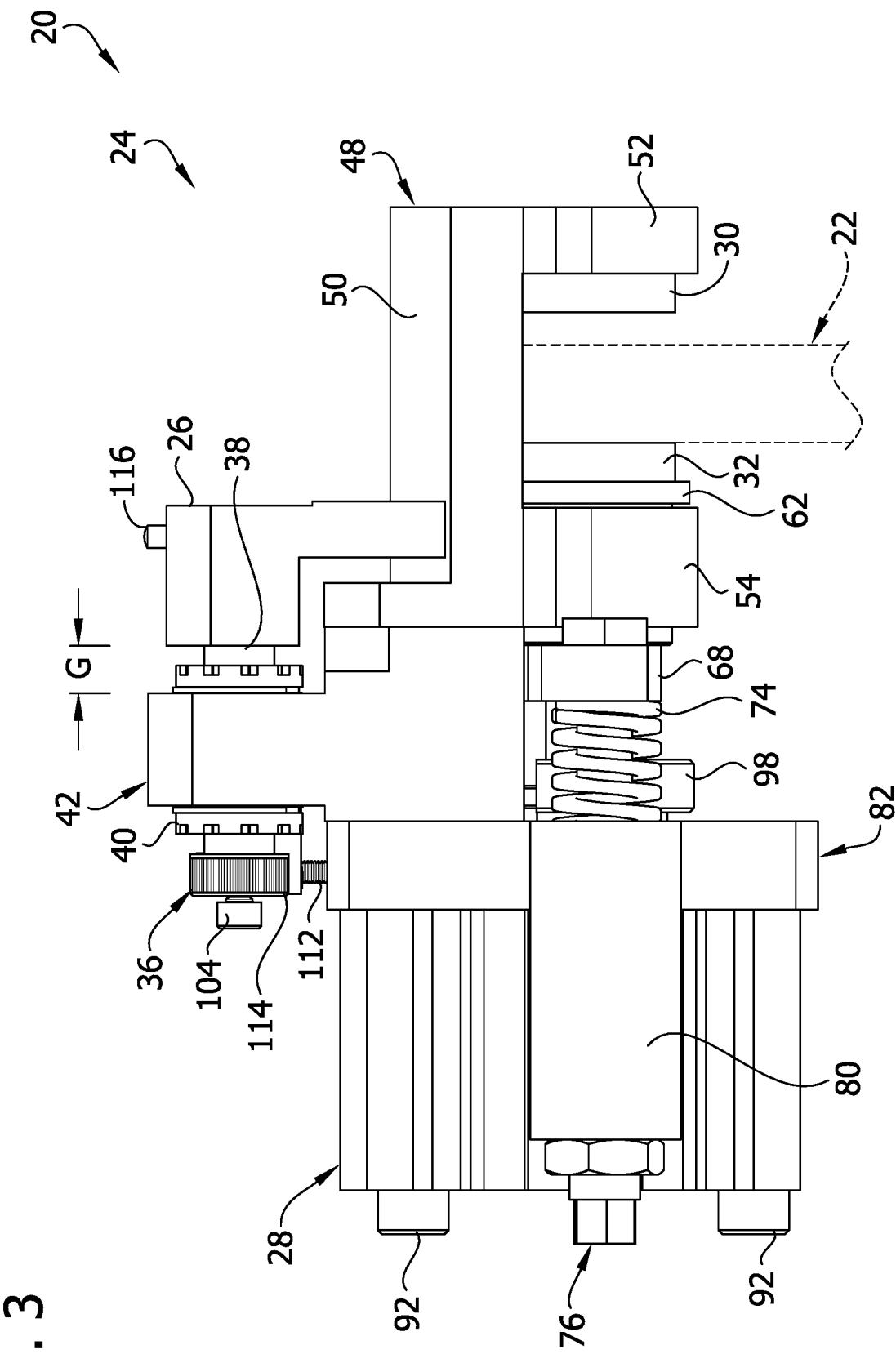
FIG. 3 is a front elevation of the brake caliper.

Referring now to the drawings and in particular to FIGS. 1-3, a brake 20 constructed according to one embodiment of the present invention includes a rotor 22 (shown in phantom) and a brake caliper 24. The rotor 22 may be connected to another part (not shown). In one application, the rotor 22 may be attached to a roll that is constructed to receive product such as plastic film. It may be critical for the roll to be stopped at precise locations. However, it will be understood that other applications for the brake 20 could be made within the scope of the present invention. The brake caliper 24 comprises machine mount 26 for attachment to a frame of an apparatus (not shown) that is stationary with respect to the rotor 22 and the remainder of the brake caliper. The frame of the apparatus may be broadly considered to be a fixed surface that supports the brake 20. A caliper 28 is carried by the machine mount 26 (broadly, "a mount") and operable to move brake pads 30, 32 into an out of engagement with the rotor 22 for braking and releasing.

The caliper 28 is connected to the machine mount 26 by a pair of linear bearings 36, each including a bar 38 threadably connected to the machine mount (see, FIG. 9) and extending through a respective bearing element 40 fixed within an opening in a spacing body 42. The bars 38 are fixed with respect to the machine mount 26, but the bearing elements 40 are free to slide along the bars so that the spacing body 42 may move linearly with respect to the bars and the machine mount, as will be described more fully hereinafter. Each bar 38 has a threaded end 44 attached to the machine mount 26. The bearing elements 40 each engage a respective one of the bars 38 over a substantial length of the bar providing strength and stability for the caliper 28. In one embodiment, the bearing element 40 engages the bar 38 over at least about 25% of the length of the bar between the mount and a head of the bar. In other embodiments the bearing element engages the bar over at least 35%, at least 50%, at least 65% and at least 80% of the length of the bar between the mount and the head of the bar.

Figure 8:
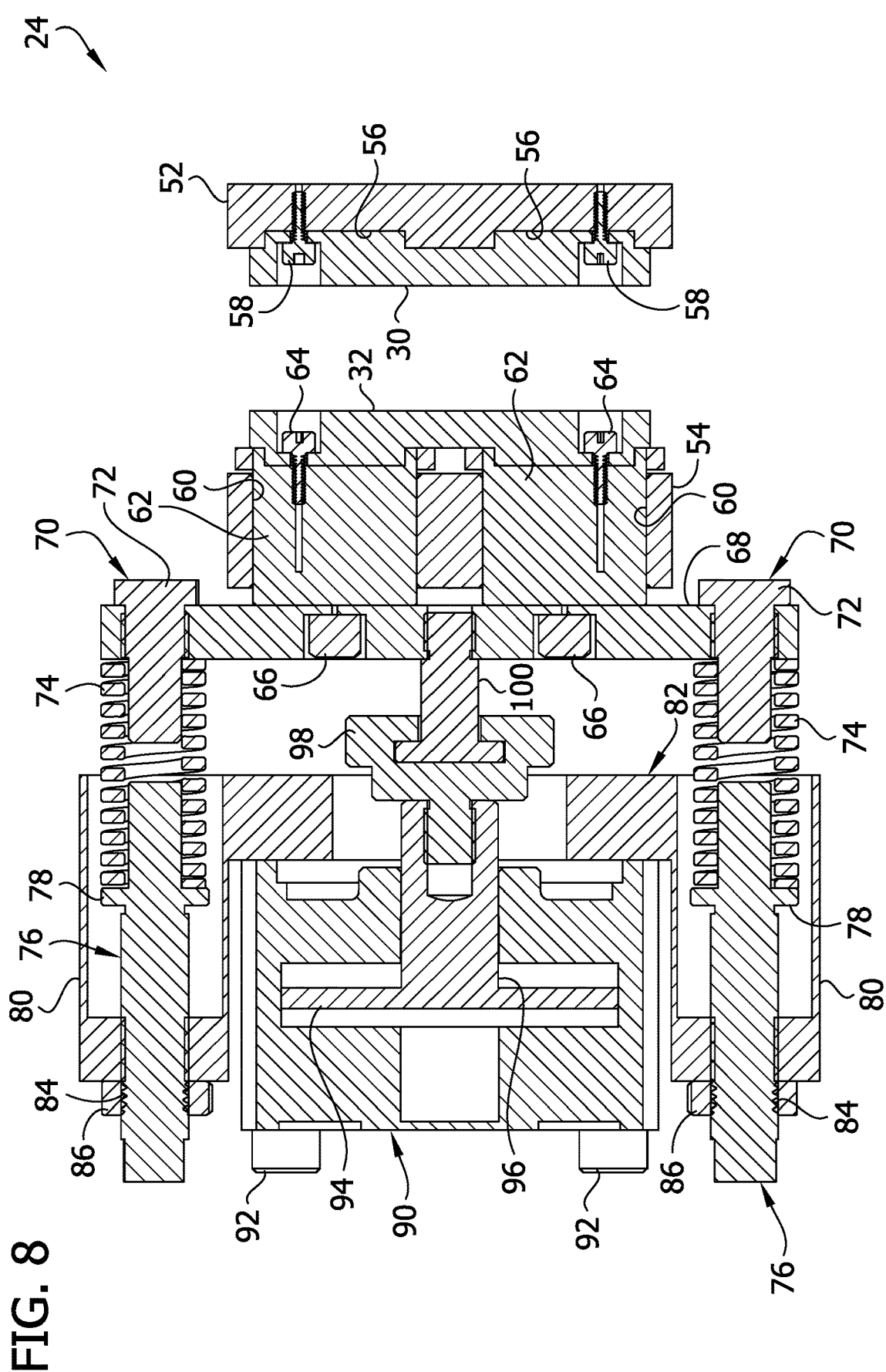
FIG. 8 is a fragmentary section taken in the plane including line 8-8 of FIG. 4.
Figure 10:
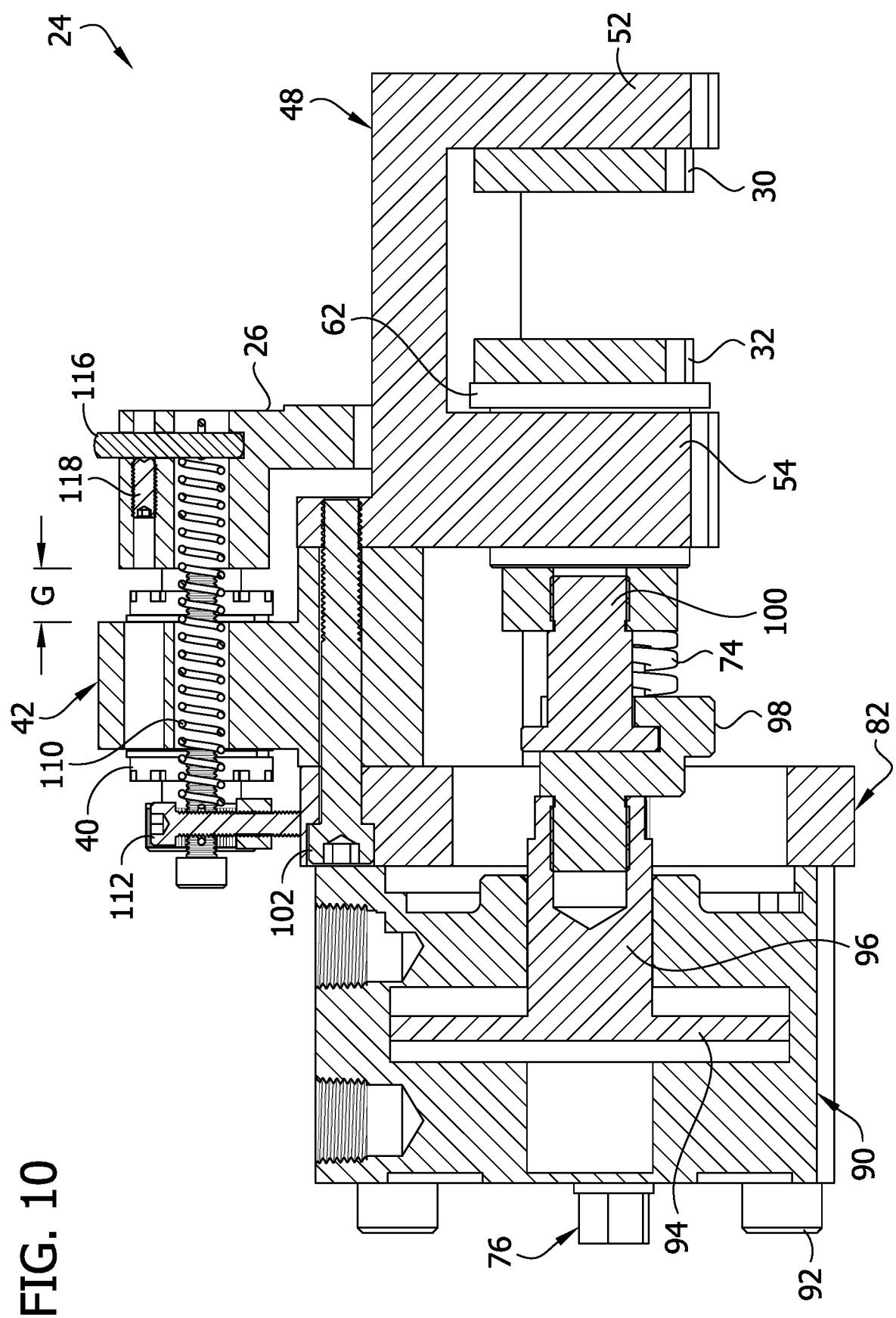
FIG. 10 is a section taken in the plane including line 10-10 of FIG. 6.
Figure 11:
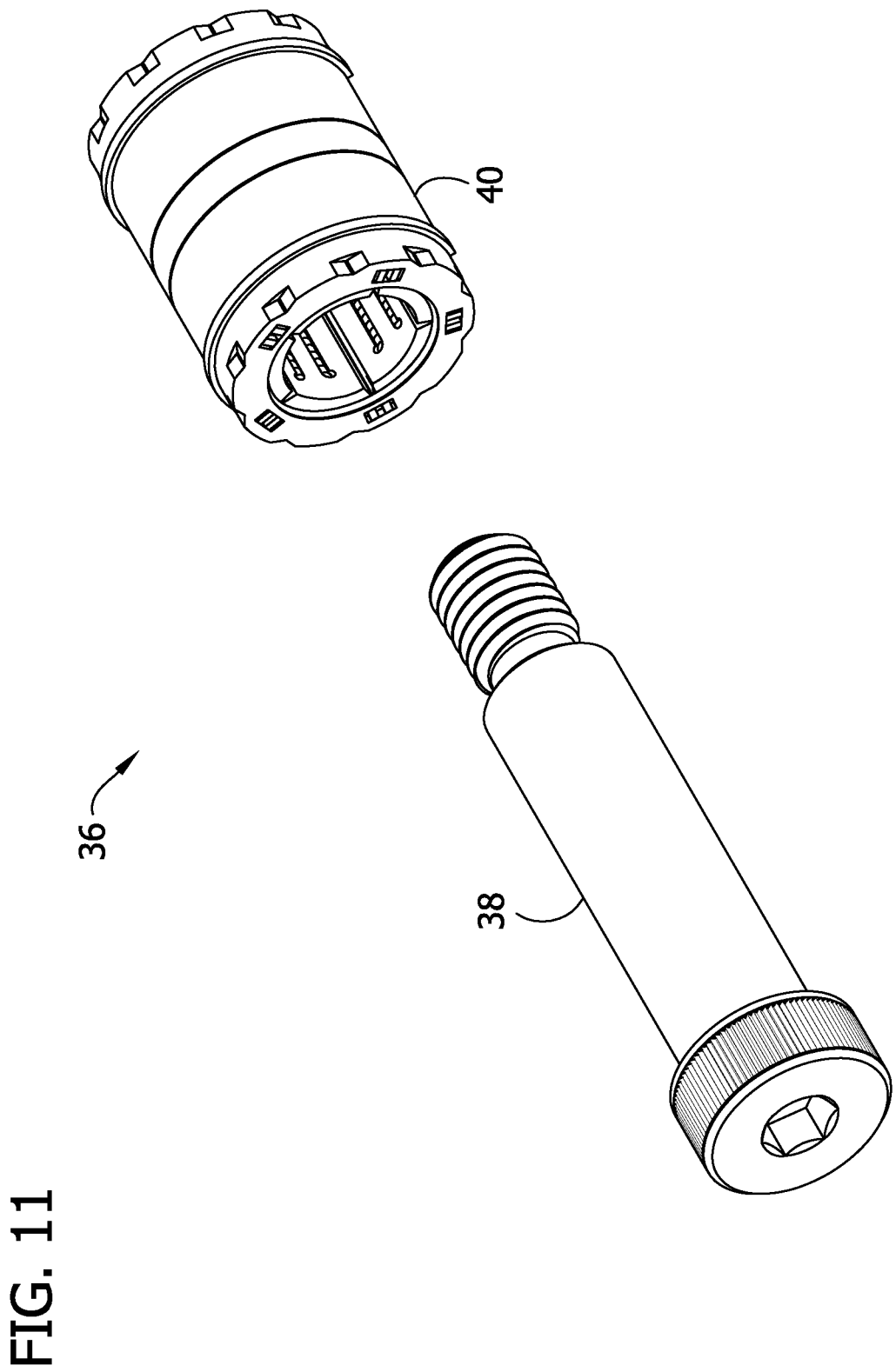
FIG. 11 is an exploded perspective of a linear bearing rod and sleeve.

Referring now also to FIGS. 8 and 10, a brake frame 48 bolted to the spacing body 42 has an arcuate connecting member 50 and opposing first and second arms 52, 54 projecting from the connecting member. In the illustrated embodiment, the connecting member 50, first and second arms 52, 54 are formed as a single piece of material. The curvature of the connecting member 50 and first and second arms 52, 54 generally corresponds to the curvature of a peripheral edge of the rotor 22, a segment of which is received between the opposing arms. The first arm 52 located most remotely from the spacing body 42 includes two recesses 56 that receive protruding portions of one of the brake pad 30. Screws 58 mount the brake pad 30 on the first arm 52 so that the brake pad is fixed to the brake frame 48 for conjoint movement. The opposite, second arm 54 of the brake frame 48 has two openings 60, each of which receive a pad cylinder 62 through the second arm. The brake pad 32 is attached to the pad cylinders 62 by screws 64 so that the brake pad can move conjointly with the pad cylinders relative to the second arm 54 and brake pad 30 mounted on the first arm 52. Each of the pad cylinders 62 is mounted by a screw 66 on a pusher plate 68 so that the cylinders move as a unit with the pusher plate.

The pusher plate 68 has openings at opposite sides that each receive a holding bolt 70 having a head 72 engaging the pusher plate and extending through the opening in the pusher plate. One end of a compression spring 74 is received around the holding bolt 70. The opposite end of the compression spring 74 is received around an adjustment bolt 76 and bears against a flange 78 of the adjustment bolt. First ends of the holding bolt 70 and adjustment bolt 76 are spaced apart from each other in the compression spring (see, FIG. 8). A second end portion of the adjustment bolt 76 passes into a receptacle 80 of an actuator mount plate 82 and out through an aperture in the actuator mount plate. The second end portion includes a threaded segment 84 that is engaged with a nut 86 that bears against the actuator mount plate 82 outside the receptacle 80. By selectively turning the nut 86 to move along the threaded segment 84 of the adjustment bolt 76, the distance between the first end of the holding bolt 70 and the first end of the adjustment bolt can be changed. If more of the adjustment bolt 76 is extended into the receptacle 80 the space between the first end of the holding bolt 70 and adjustment bolt 76 decreases thereby increasing the compression of the compression spring 74. If less of the adjustment bolt 76 is received in the receptacle 80, the space between the first ends of the holding bolt 70 and adjustment bolt 76 is increased, thereby decreasing the compression. In this manner the force with which the brake pad 32 is pushed toward the opposite brake pad 30 can be adjusted.

An actuator in the form of a pneumatic cylinder 90 is fixed to the actuator mount plate 82 by four bolts 92. As shown in FIG. 10, the cylinder 90 includes a piston 94 and a rod 96 connected to the piston. The piston 94 is attached by a cylinder insert 98 and a pushing insert 100 to the pusher plate 68. Actuation of the cylinder 90 to extend the piston rod 96 outward pushes against the pusher plate 68 and drives the pusher plate and brake pad 32 attached to it toward the opposite brake pad 30 into engagement with the rotor 22 to apply braking. Retraction of the piston rod 96 pulls the brake pad 32 away from the opposite brake pad 30 and releases braking.

The actuator mount plate 82 is secured to the brake frame 48 by bolts 102 (FIG. 10, only one is shown). The brake frame 48 and actuator mount plate 82 clamp the spacing body 42 between them so that they act as a single piece. It will be understood from the foregoing description that the brake pad 32 moves with respect to the brake frame 48, spacing body 42 and actuator mount plate 82. However, the brake pads 30, 32 will both be moved when the brake frame 48, spacing body 42 and actuator mount plate 82 move (i.e., when the caliper 28 moves), as will be described.

Figure 9:
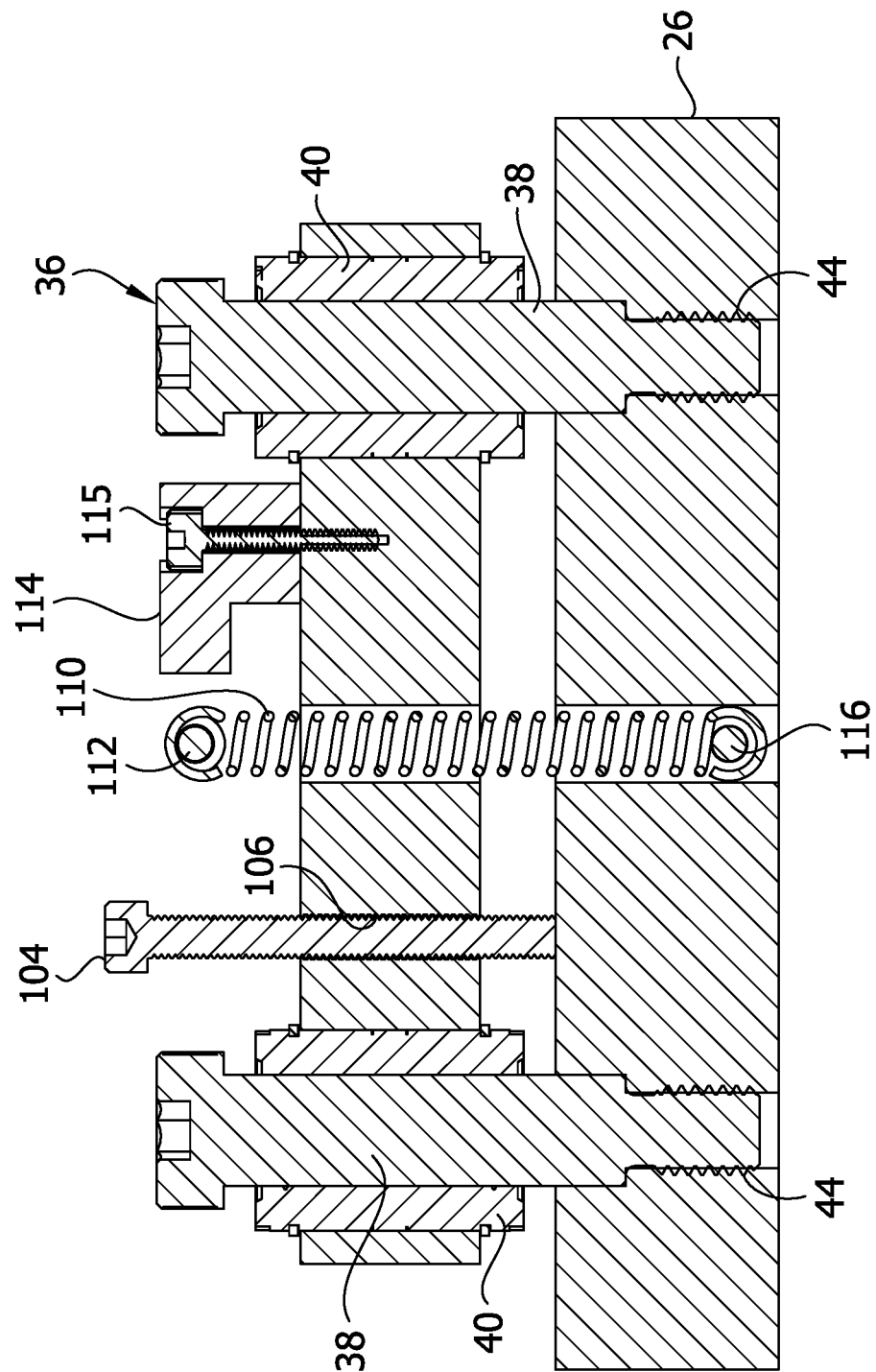
FIG. 9 is a section taken in the plane including line 9-9 of FIG. 2.

The brake caliper 24 includes an adjustment feature to facilitate centering the rotor 22 between the brake pads 30, 32 prior to actuation of the pneumatic cylinder 90 to apply braking. Centering greatly facilitates more equal application of pressure and reduces uneven wear on the brake pads 30, 32. Centering can be accomplished by adjusting a gap G between the machine mount 26 and the spacing body 42. The maximum dimension for the gap G can be set and adjusted using a locating bolt 104 (broadly, "a stop") threaded through an opening 106 in the spacing body 42 such that the bolt is connected by threaded engagement with the spacing body. An end of the locating bolt 104 opposes a face of the machine mount 26. An extension spring 110 is connected to the spacing body 42 by a pin 112 (broadly, "an anchor") attached to the extension spring and secured to the spacing body by a small bracket 114. The bracket is attached to the spacer body 42 by screws 115. The bolt 104 may be broadly considered "an adjustor." The extension spring 110 is secured to the machine mount 26 by a pin 116 received in the machine mount and secured by a set screw 118. The configuration of the extension spring 110 and the manner of securing it to the machine mount 26 and spacing body 42 may be other than described within the scope of the present invention. The extension spring 110 urges the spacing body 42 to move toward the stationary machine mount 26 until the end of the bolt 104 engages the interior face of the machine mount as shown in FIG. 9. In this way, adjustment of the bolt 104 sets a minimum spacing between the machine mount 26 and the spacing body 42, and more importantly can be used to calibrate the location of the brake pads 30, 32 relative to the rotor as will be described. Movement of the spacing body 42 causes movement of the entire caliper 28. This shifts the location of the brake pads 30, 32 with respect to the rotor 22 to the right as viewed in FIGS. 3 and 4. By selecting the particular extension spring 110 and/or adjusting the location of the pin 112, the size of the gap G in the rest position can be adjusted, which also adjusts the position of the brake pads 30, 32 relative to the rotor 22.

Figure 4:
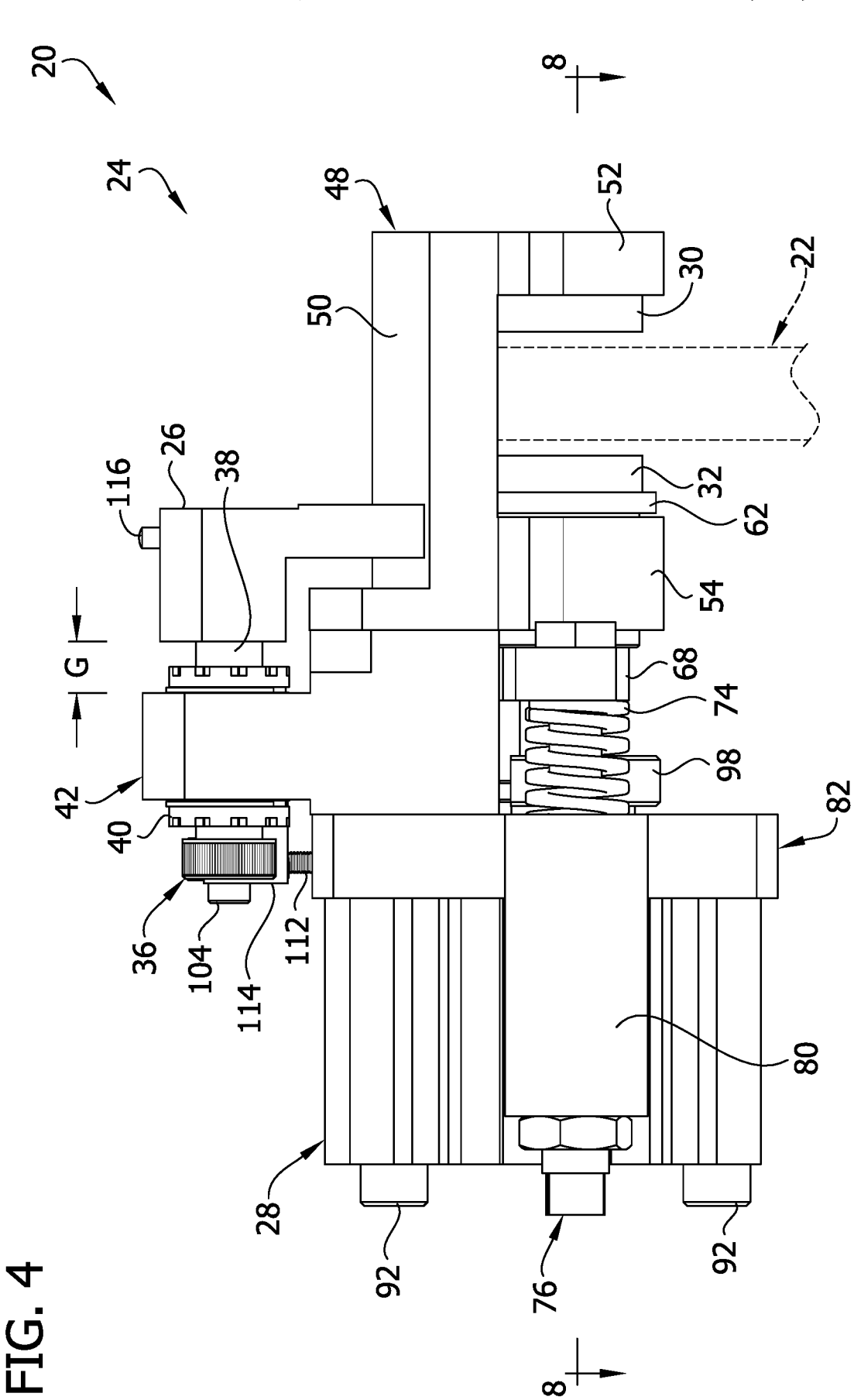
FIG. 4 is a front elevation of the brake showing the rotor in phantom.
Figure 5:
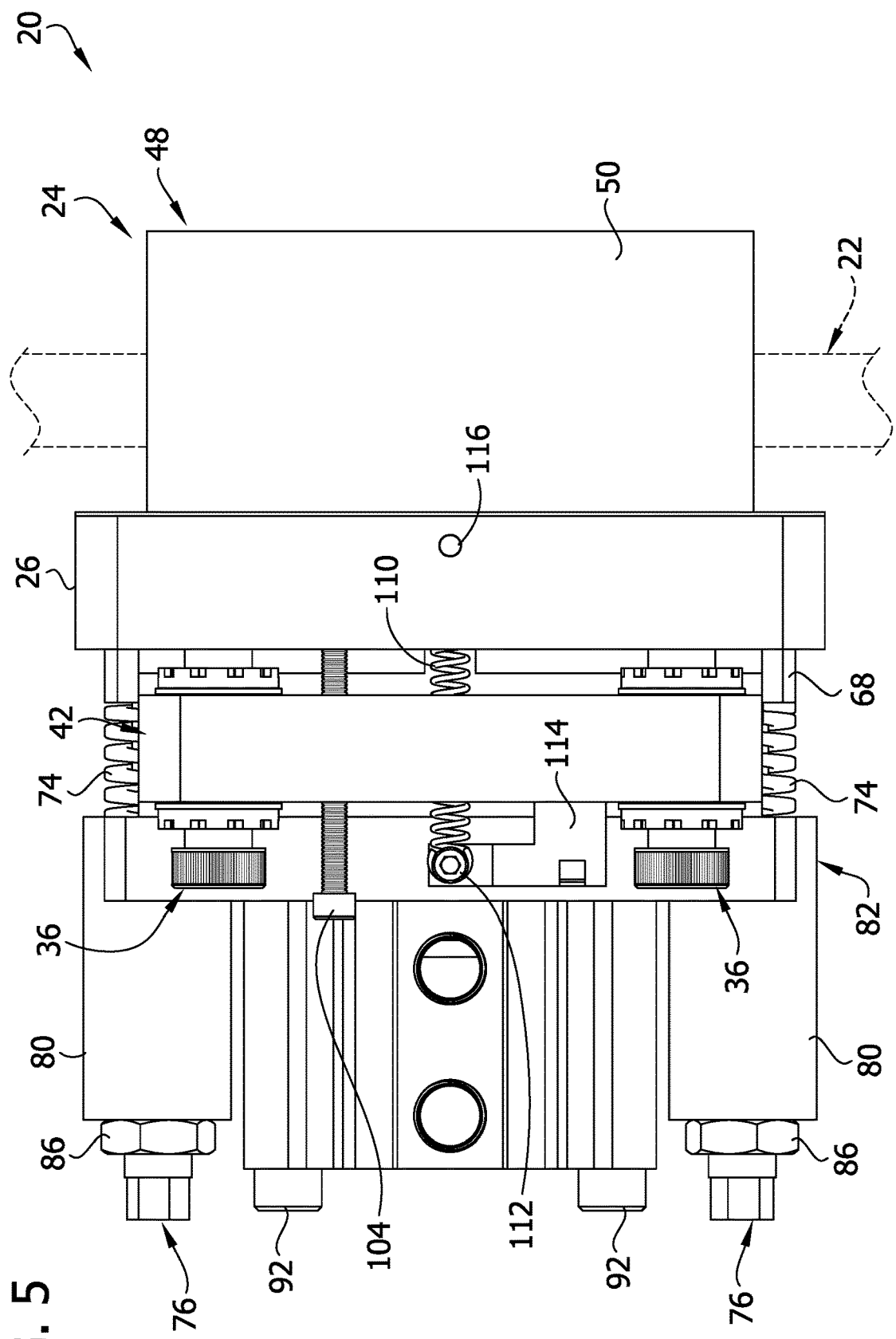
FIG. 5 is a top plan view of the brake caliper of FIG. 4.
Figure 6:
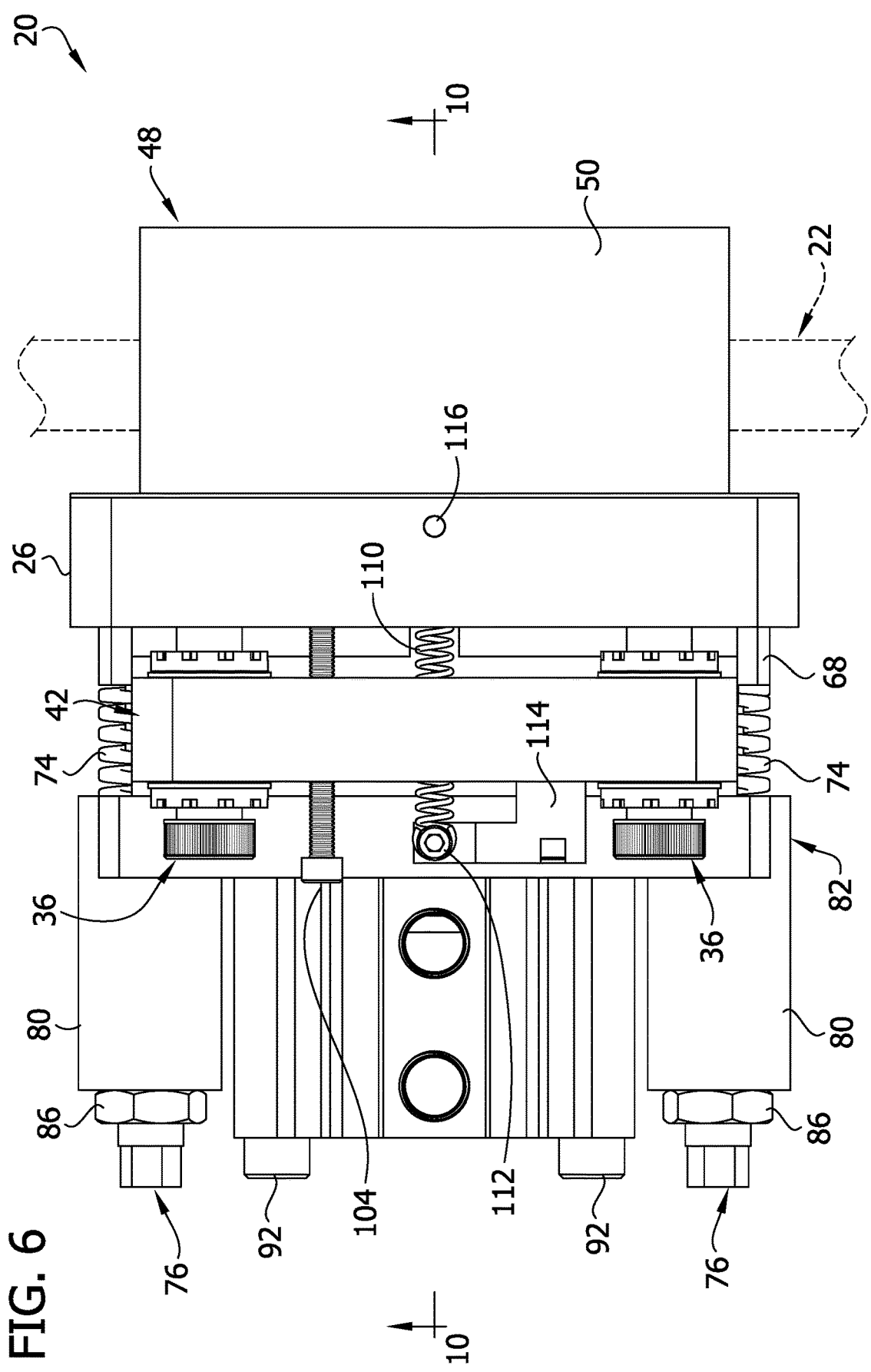
FIG. 6 is a top plan view like FIG. 6, but showing an adjusted position of the brake caliper.
Figure 7:
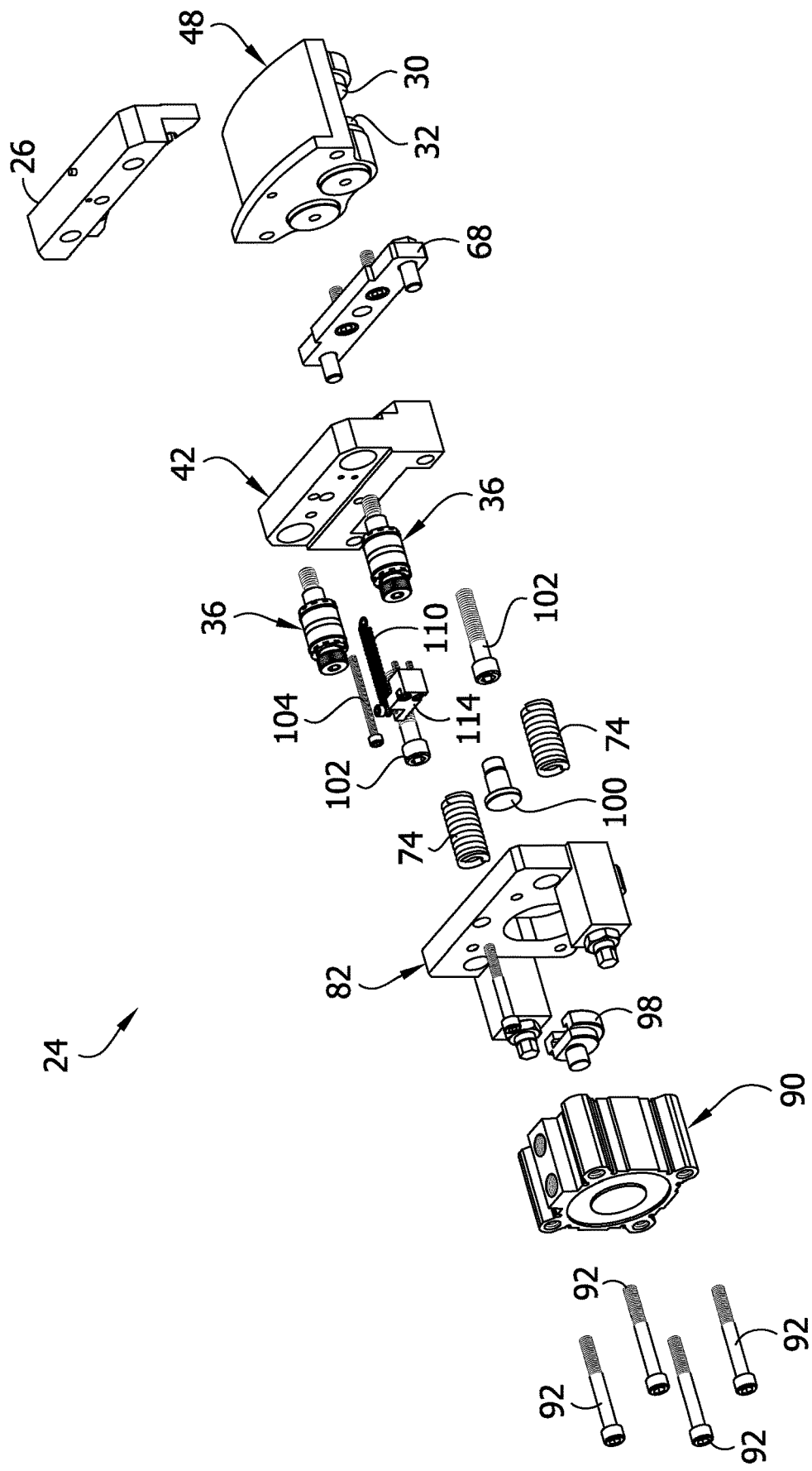
FIG. 7 is an exploded perspective of the brake caliper.

Referring to FIG. 3, the brake 20 is shown so that the center of the rotor 22 is located closer to one of the brake pads 32 than the other brake pad 30 in an unactuated condition of the brake caliper 24. More specifically, the extension spring 110 pulls the caliper 28 to the right (as the brake 20 is oriented in FIG. 3, so that the brake pad 32 engages the rotor 22. This off center location is not desirable as a starting position for the brake pads 30, 32. Engagement with the rotor 22 by the brake pad 32 cause the rotor to abrade the brake pad even when the brake 20 is not activated to brake the rotor. The gap G between the machine mount 26 and spacing body 42 shown in FIG. 3 can be changed (thereby changing the location of the brake pads 30, 32) by turning the bolt 104 so that more of the bolt is located between the machine mount 26 and the spacing body 42. This movement increases the size of the gap G and pushes the caliper 28, including both of the brake pads to the left relative to the machine mount and the rotor 22 form the position shown in FIG. 3 to the position shown in FIG. 4. As a result, the brake pads 30, 32 can be repositioned from what is shown in FIG. 3 to what is shown in FIG. 4, where the rotor 22 is substantially centered between the brake pads 30, 32. In this position, the brake pads 30, 32 are generally equidistant from the rotor 22, which is conducive to even wear and longer life for the brake pads. The brake 20 experiences fewer unbalanced forces, which also improves the robustness of the brake.

In operation, the rotor 22 can be driven to turn along with the roll or other component that is to be braked. When it is desired to stop rotation of the rotor 22, the pneumatic cylinder 90 of the caliper 28 is actuated to extend the piston rod 96 (e.g., as shown in FIG. 10), driving the pusher plate 68 and the brake pad 32 attached to the pusher plate toward the opposing brake pad 30. The brake pad 32 engages a side of the rotor 22 causing a reaction force to be transmitted back through the brake pad to the actuator mount plate 82. This causes the actuator mount plate 82, spacing body 42 and brake frame 48 to move against the bias of the extension spring, bringing the brake pad 30 affixed to the brake frame into contact with the rotor 22. This also results in the bolt 104 disengaging the interior face of the machine mount 26. The braking force is controlled by the compression of the compression springs 74 and movement of the caliper 28 allows the force to equalize between the brake pads 30, 32. When braking is stopped, the pneumatic cylinder 90 pulls the brake pad 32 away from the rotor 22. The reaction force experienced by the brake pad 30 mounted on the brake frame 48 causes the caliper 28 to shift, moving the brake pad 30 away from the rotor 22.

Having described the invention in detail, it will be apparent that modifications and variations are possible without departing from the scope of the invention defined in the appended claims. For example, where specific dimensions are given, it will be understood that they are exemplary only and other dimensions are possible.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A brake caliper for selectively applying a braking force to a rotor, the braking caliper comprising:
   a mount for attaching to a fixed surface; and
   a caliper connected to the mount for movement relative to the mount, the caliper including,
      a brake frame,
      a first brake pad affixed to the brake frame,
      a pusher plate supported by the caliper and movable with respect to the caliper,
      a second brake pad connected to the pusher plate for conjoint movement with the pusher plate with respect to the caliper, the second brake pad being arranged in generally opposing relationship with the first brake pad for engaging and braking opposite sides of the rotor, and
      an adjustor for controlling a position of the caliper with respect to the mount, the adjustor being configured for adjustment to change the position of the caliper with respect to the mount in an unactuated condition of the brake caliper thereby moving the caliper with respect to the mount and adjusting the position of the first and second brake pads with respect to the rotor, the adjustor including an actuator portion and a stop portion, the actuator portion configured to be actuated to adjust the adjustor, the stop portion being disposed between the caliper and mount and the caliper being disposed between the actuator portion and the mount.

2. The brake caliper as set forth in claim 1 wherein the actuator portion is configured to move the stop portion to space the mount from the caliper at different selected distances.

3. The brake caliper as set forth in claim 2 wherein the adjustor comprises a locator bolt threadably engaged with the caliper and extending through the caliper, the locator bolt being arranged for engaging the mount thereby to set a spacing between the caliper and the mount, whereby turning the locator bolt changes the spacing between the caliper and the mount.

4. The brake caliper as set forth in claim 3 further comprising a spring connected to the caliper and to the mount to urge movement of the caliper toward the mount.

5. The brake caliper as set forth in claim 4 wherein the spring is an extension spring.

6. The brake caliper as set forth in claim 1 further comprising a spring connected to the caliper and to the mount to urge movement of the caliper toward the mount.

7. The brake caliper as set forth in claim 6 wherein the caliper further comprises a spacing body connected to the mount for movement relative to the mount.

8. The brake caliper as set forth in claim 7 wherein the caliper further comprises at least one linear bearing fixed to the mount and slidably supporting the spacing body for movement along a length of the linear bearing.

9. The brake caliper as set forth in claim 8 wherein the linear bearing comprises a bearing element mounted on the spacing body and a bar connected to the mount, the bar being slidably received through the bearing element.

10. The brake caliper as set forth in claim 1 wherein the caliper further comprises a linear bearing connecting the caliper to the mount.

11. The brake caliper as set forth in claim 10 wherein the linear bearing comprises a bearing element mounted on the caliper and a bar connected to the mount, the bar being slidably received through the bearing element.

12. The brake caliper as set forth in claim 1 wherein the pusher plate is connected to the caliper by a compression spring.

13. The brake caliper as set forth in claim 12 wherein the compression spring is adjustable for applying a different force to the pusher plate.

14. The brake caliper as set forth in claim 1 wherein the caliper comprises a brake frame including a first arm mounting the first brake pad thereon and a second arm supporting the second brake pad.

15. The brake caliper as set forth in claim 14 wherein the brake frame is formed as a single piece of material.

16. The brake caliper as set forth in claim 1 wherein the actuator portion comprises a bolt head.

17. A brake caliper for selectively applying a braking force to a rotor, the braking caliper comprising:
   a mount for attaching to a fixed surface;
   a caliper connected to the mount for movement relative to the mount, the caliper including,
      a brake frame,
      a first brake pad affixed to the brake frame,
      a pusher plate supported by the caliper and movable with respect to the caliper,
      a second brake pad connected to the pusher plate for conjoint movement with the pusher plate with respect to the caliper, the second brake pad being arranged in generally opposing relationship with the first brake pad for engaging and braking opposite sides of the rotor, and an adjustor for controlling a position of the caliper with respect to the mount, the adjustor being configured for adjustment to change the position of the caliper with respect to the mount in an unactuated condition of the brake caliper thereby moving the caliper with respect to the mount and adjusting the position of the first and second brake pads with respect to the rotor, and a compression spring, the pusher plate being connected to the caliper by the compression spring, the compression spring being adjustable for applying different force to the pusher plate;

wherein the caliper comprises an adjustment bolt engaging a portion of the compression spring in opposition to the pusher plate, the adjustment bolt being mounted on the caliper for movement relative to the caliper to change a distance between the adjustment bolt at the pusher plate to change the force of the compression spring.

18. A brake caliper for selectively applying a braking force to a rotor, the braking caliper comprising:

a mount for attaching to a fixed surface; and a caliper connected to the mount for movement relative to the mount, the caliper including, a brake frame, a first brake pad affixed to the brake frame, a pusher plate supported by the caliper and movable with respect to the caliper, a second brake pad connected to the pusher plate for conjoint movement with the pusher plate with respect to the caliper, the second brake pad being arranged in generally opposing relationship with the first brake pad for engaging and braking opposite sides of the rotor, an adjustment bolt;

a holding bolt engaging the pusher plate, the holding bolt being in aligned, spaced apart relation with the adjustment bolt; and an adjustable spring received around the adjustment bolt and the holding bolt, the adjustable spring engaging the pusher plate for urging the pusher plate to move toward the first brake pad.

19. The brake caliper as set forth in claim 18 wherein the engages the adjustable spring, the adjustment bolt being movable with respect to the pusher plate for changing a distance between the adjustment bolt and the pusher plate.

20. The brake caliper as set forth in claim 19 wherein the caliper comprises a nut threadably engaged with the adjustment bolt so that rotation of the nut changes a position of the adjustment bolt relative to the pusher plate.

21. The brake caliper as set forth in claim 20 wherein the holding bolt engages the adjustable spring, the holding bolt having an end spaced from an end of the adjustment bolt.

* * * * *